No. 623,968. Patented May 2, 1899.
B. C. BATCHELLER.
PNEUMATIC TRANSMISSION SYSTEM.
(Application filed Feb. 7, 1898.)
(No Model.) 2 Sheets—Sheet 1.
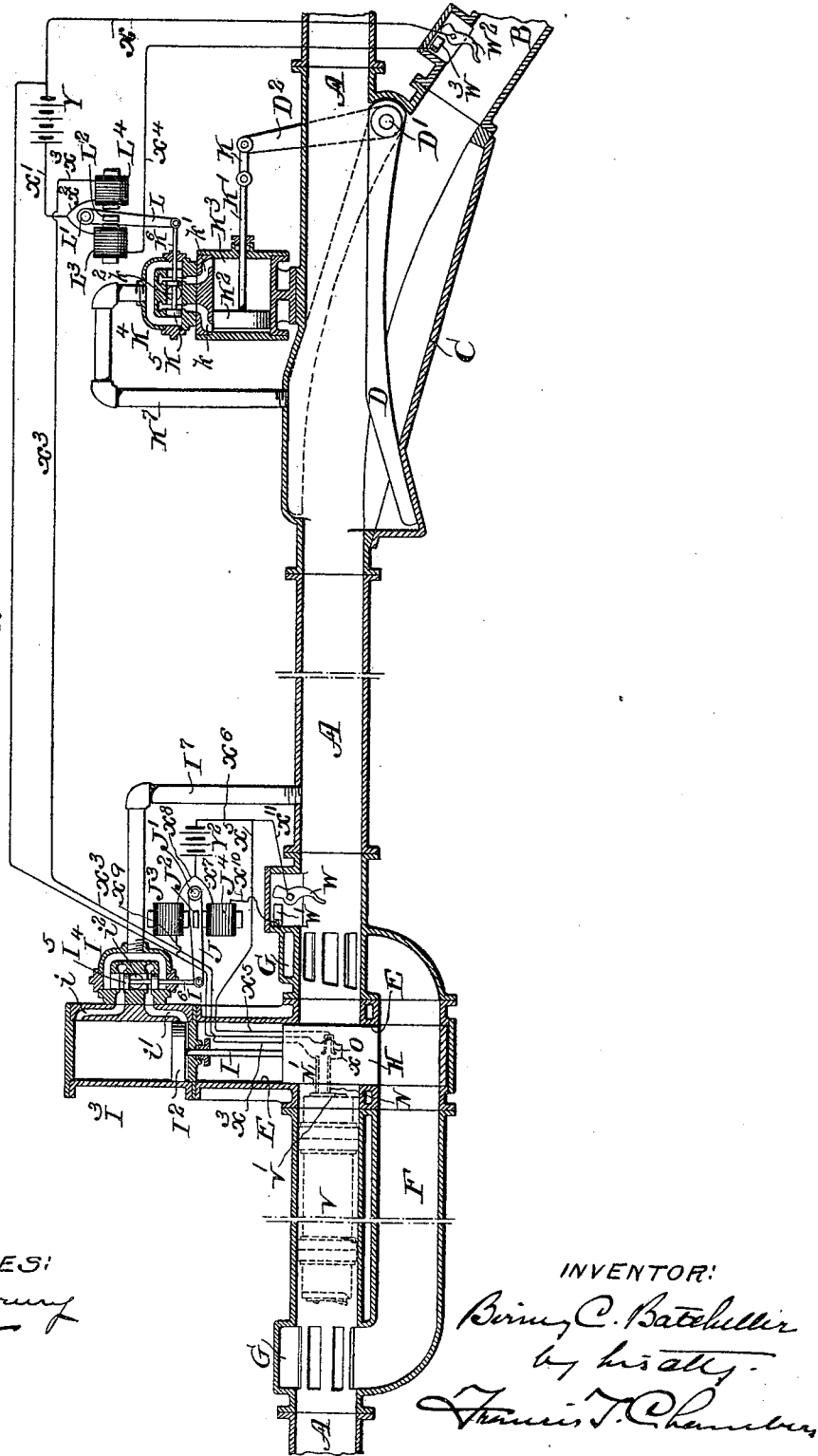
WITNESSES:
INVENTOR:

No. 623,968. Patented May 2, 1899.
B. C. BATCHELLER.
PNEUMATIC TRANSMISSION SYSTEM.
(Application filed Feb. 7, 1898.)
(No Model.) 2 Sheets—Sheet 2.
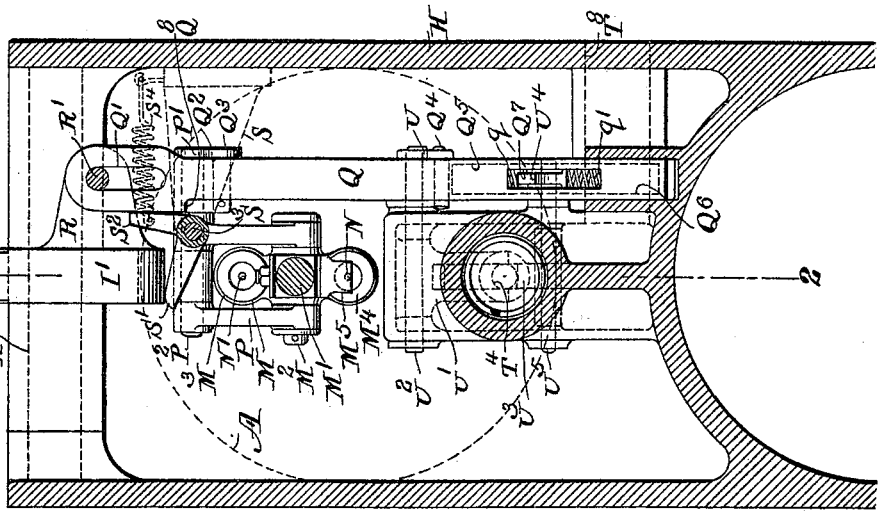
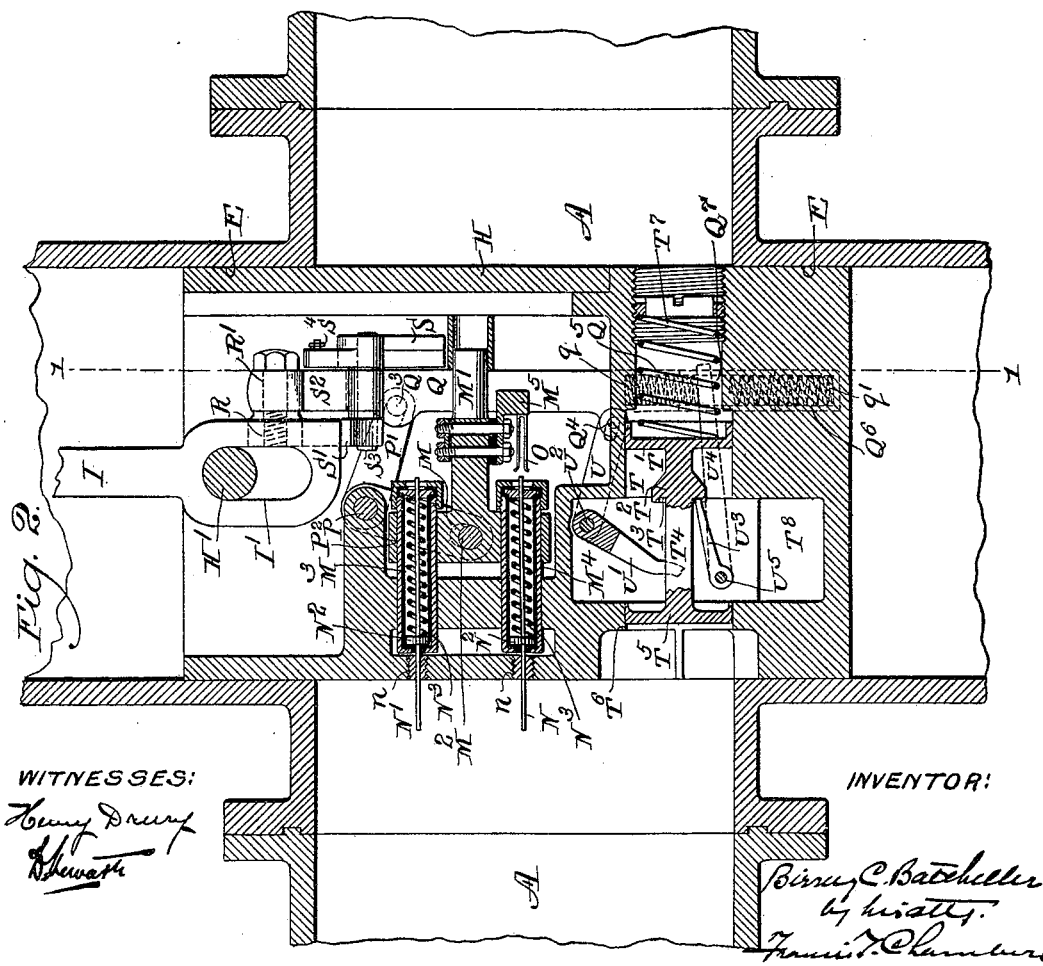
WITNESSES: INVENTOR:

UNITED STATES PATENT OFFICE.

BIRNEY C. BATCHELLER, OF PHILADELPHIA, PENNSYLVANIA.

PNEUMATIC TRANSMISSION SYSTEM.

SPECIFICATION forming part of Letters Patent No. 623,968, dated May 2, 1899.

Application filed February 7, 1898. Serial No. 669,326. (No model.)

*To all whom it may concern:*

Be it known that I, BIRNEY CLARK BATCHELLER, a citizen of the United States of America, residing in the city and county of Philadelphia, in the State of Pennsylvania, have invented a certain new and useful Improvement in Pneumatic Transmission Systems, of which the following is a true and exact description, reference being had to the accompanying drawings, which form a part thereof.

My invention relates to pneumatic transmission systems, and has for its object particularly to provide an improved system for automatically actuating a switch which governs the course of a carrier through a tube or its branches, though certain features of my new construction are adapted for independent uses.

In my patent dated December 21, 1897, No. 595,755, I have described and shown a mechanism for switching or transferring carriers from a main tube to other tubes or branches by automatic mechanism operated and controlled by selecting mechanism connected with the carrier and in which provision is made for checking the impetus of the carrier in advance of its operation on the tripping or selecting device upon which it acts; and a leading feature of my present invention is the application of the general and leading principle of my said prior patent to the actuation of a switch as distinguished from a transferring apparatus such as is shown in my said patent.

The nature of my improvements will be best understood as described in connection with the drawings, in which they are illustrated, and in which—

Figure 1 is a sectional elevation showing a portion of a pneumatic transmission-tube system including a branch tube and provided with my improvements. Fig. 2 is a longitudinal section through the tube and a cross-section through a gate arranged to open and close said tube, taken as on the section-line 2 2 of Fig. 3; and Fig. 3 is a cross-section through the gate, taken on the section-line 1 1 of Fig. 2.

A indicates the main tube of the system, B a branch tube leading therefrom, and C the switch box or chamber, formed at the junction of the main and branch tubes.

D is the switch, which when in the lower position (shown in full lines in Fig. 1) closes the branch tube and guides the carrier through the box C, while in the position shown in dotted lines it closes the main tube and guides the carrier into the branch B. The switch is pivoted on a rock-shaft D', from which also extends a lever-arm D², by which the switch is actuated at a point in advance of the junction of the main and branch tubes. An opening E is formed in the main tube to give passage to a sliding gate H.

F is an air by-pass leading around the gate-passage and connecting with the main tube, on each side thereof, through slotted openings, as indicated at G G. The function of this air by-pass is to permit the free passage of the air around the gate when it is closed and for reasons which will be understood in connection with the further description. The connection G with the main tube on the side from which the carrier advances to the gate should be at such distances from the gate as to give ample room for a carrier to lie between it and the gate. The sliding gate H is connected with a piston-rod I, secured to a piston I², working in a cylinder I³, having ports $i$ and $i'$ on top and bottom, said ports leading from the valve-chamber I⁴, the valve I⁵ working in which is connected with a stem I⁶, which in turn is attached to the outer arm of a lever J, pivoted at J' and having attached to it an armature J², placed, as shown, between two electromagnets J³ and J⁴. In the plan shown compressed air is supplied to the valve-box I⁴ through a pipe I⁷, leading to the main transmission-tube, and in the valve-box an exhaust-port $i²$ is provided, controlled, like the inlet-port, by the motion of the valve I⁵. The connection between the gate and the piston-rod I is, for reasons which will be described, preferably not made positive, but effected by means of a slot I' in the end of the piston-rod, through which passes the pin H', secured in the upper part of the gate. (See Fig. 2.)

Turning next to the mechanism for actuating the switch, (shown at the right hand of Fig. 1,) the free end of the lever D² is connected by a link K to the piston-rod K' of a piston K², said piston working in a cylinder K³, having ports $k$ and $k'$ leading into its end from a valve-box K⁴, K⁵ being the valve working in said valve-box and connected by its stem $K^6$ with the free end of a lever L, pivoted at $L'$ and having attached to it an armature $L^2$, lying between the two electromagnets $L^3$ and $L^4$. Compressed air is led from the tube to the valve-box by a connection $K^7$, and the exhaust of the valve-box is indicated at $k^2$. It is obvious that the admission of air to either end of the cylinders $I^3$ and $K^3$, as controlled by the valves appropriate to each cylinder, will by the connections described cause in the one case the opening and closing of the gate and in the other case the movement of the switch D from one to the other of its two operative positions and that the movements of the valves are controlled by the energizing of one of the two magnets arranged to operate the said valves in each case.

Returning now to the detailed construction of the mechanism immediately connected with the gate, M is a "head-piece," so to speak, situated in a convenient cavity in the gate, having a rearwardly-extending stem $M'$, conveniently guided, as shown, and a pin $M^2$ extending through it, so as to form what may be called by analogy "trunnions," which in turn are engaged by the lever-arms P, secured in turn to a rock-shaft $P^2$ and connected by a lever $P'$, also secured to said rock-shaft. The head M supports the two tubes $M^3$ and $M^4$, which extend from it forward toward the front face of the gate and serve to hold the springs $N^3$, which press against plungers $N^2$, secured to the rod conductors N and $N'$, the rear parts of these rods extending backward through the tubes $M^3$ and $M^4$ and their front portions extending forward out of said tubes and through insulated openings $n$ $n$ in the front face of the gate. Both of these pins are connected in electric circuits, as illustrated in Fig. 1 and as will hereinafter be described. On the stem $M'$ of the head M is secured a bracket $M^5$, having spring-lips O arranged immediately to the rear of rod N and in such position that when the said rod is pushed backward it will be engaged by the spring-lips, which, like the rod itself, are connected in electric circuit, as indicated in Fig. 1.

Q is a rod extending vertically through the gate, as shown, and having a slotted opening $Q'$ at its upper end, into which passes a pin $R'$, secured on a bracket R, extending out from the side of the slotted end $I'$ of the piston-rod I. To a slot (indicated at $Q^3$) in the rod Q is connected by means of a pin the free end of the lever-arm $P'$. A similar slot-and-pin connection is made between the said rod and the free end of a lever U, (to be hereinafter described,) as indicated at $Q^4$, and the lower end of the rod Q is, as shown, made hollow, as indicated at $Q^5$ and $Q^6$, forming upper and lower spring-cases, between which is formed a slot $Q^7$.

$q$ and $q'$ indicate the springs, situated in the spring cavities or cases referred to.

is a bracket extending into the cavity in te, in the rear wall thereof, and holding at its outer end a pivot-pin $S^3$, upon which is pivotally secured the bell-crank lever $S'$ $S^2$, the arm $S'$ lying immediately beneath the slotted end $I'$ of the rod I, and the arm $S^2$, normally drawn toward the rear by a spring $S^4$, is arranged to engage with the shoulder $Q^8$, formed on the upper part of the rod Q, when the said rod is raised to a sufficient height.

T is a guideway, as shown, of cylindrical form, formed in the lower part of the gate, and in which moves a head $T'$, attached to a stem $T^2$, upon which is formed a retaining-lip $T^3$, beyond which lip the body $T^4$ of the stem is adapted to give passage to the forked arms of the lever $U'$. Upon the forward end of the stem $T^2$ is secured a "valve," as it may properly be called, $T^5$, which in the particular instance illustrated is a piston working in a companion air-passage $T^6$, formed through the front face of the valve and connecting with a passage $T^8$, leading through the lower part of the gate, and by which air is permitted to escape through the same.

$T^7$ is a spring arranged in a convenient cavity on the rear side of the gate to act against the head $T'$ and press it and the valve $T^5$ outward. The slotted arms $U'$, already mentioned, are attached to a rock-shaft $U^2$, to which is also attached the lever-arm U, connected, as before described, at $Q^4$ with the rod Q.

$U^3$ is a catch-lever adapted, when in the position shown, to engage with the lip $T^3$ on the stem $T^2$, said catch-lever being secured to a rock-shaft $U^5$, to which is also attached a lever-arm $U^4$, which said last-mentioned arm extends through the slot $Q^7$ in the rod Q and lies between the springs $q$ and $q'$.

The electrical connections of my preferred construction are indicated in Fig. 1. Y and $Y^2$ indicate batteries, and W a finger circuit-closing device extending into the main tube A and arranged, when pushed backward by an advancing carrier, to come in contact with a spring $W'$. $W^2$ is a similar circuit-closing finger arranged, when pushed backward by a carrier passing through the branch B, to come in contact with the spring $W^3$. The circuit-wiring is as follows: A wire X connects with the rod N and then, by means of branches, with the circuit-closing finger $W^2$ and the battery Y, from which connection $X'$, branching at $X^2$, leads in the one case through the electromagnet $L^4$ and thence, by the circuit-wire $X^3$, to the rod $N'$, while in the other branch the connection is through the electromagnet $L^3$ and the circuit-wire $X^4$ with the spring $W^3$. Another circuit-wire $X^5$ connects with the spring-fingers O in the gate and, branching, connects through one branch $X^{11}$ with the finger W and through the other branch $X^6$ with the battery $Y^2$. Thence branching, as indicated at $X^7$, it connects either through the electromagnet $J^4$ and wire $X^{10}$ with the spring $W'$ or through the electromagnet $J^3$ and wire $X^9$ with the line-wire X, already described.

V indicates the carrier, having at its front end a selecting-disk V', similar to those described in my former patent already referred to.

The operation of the device is readily followed. The gate H is normally closed, a free passage for air, however, through the tube A being provided through the by-pass F. A carrier V, approaching the gate after passing the first connection G, compresses the air in front of it and has its motion gradually checked as it approaches the gate H. The compression of the air in front of the carrier, acting upon the valve $T^5$, pushes it inward to a sufficient extent to free the lip $T^3$ from its engagement with the catch-lever $U^3$, and the spring $q$, resting on the upper end of the lever $U^4$, pushes this and the catch-lever down out of the plane where the catch-lever would engage with the lip $T^3$. Upon a relaxation of the air-pressure, which may occur either through the leakage of air or by a slight backward movement of the carrier, the spring $T^7$, acting on the head $T'$, pushes the valve $T^5$ outward, opening a passage for the air through the valve-closed passage $T^6$ and its connection $T^8$, whereupon the pressure in the rear of the carrier will bring it gradually and without destructive shock forward against the front of the gate, where in all cases it will engage the centrally-disposed rod N and push it in, compressing the spring $N^3$ until the rear end of the rod engages with the spring-fingers O, electrically connecting the wires X and $X^5$ and closing the circuit, which can be traced as follows: Beginning with the springs O, through the wire $X^5$ and its branch $X^6$ to the battery $Y^2$, thence through the branch $X^8$ and the electromagnet $J^3$ to the wire $X^9$, which connects with the wire X, leading to the rod N. The magnet $J^3$ being thus energized attracts the armature $J^2$ and moves the lever J upward, the said lever, acting through the valve-rod $I^6$, moving the valve $I^5$ upward, so as to open a passage for compressed air through the port $i'$ to the under side of the piston $I^2$, the same movement of the valve opening the port $i$ to the exhaust-passage $i^2$. The upward motion of the piston $I^2$, acting through the piston-rod I, draws said rod upward. The pin R' engaging with the top of the slotted end Q' of the rod Q (see Figs. 2 and 3) first of all raises the said rod through a distance equal to the length of the slot $I'$ at the end of the piston-rod. In moving through this distance the rod Q first of all carries with it the end of the lever P', which, through the rock-shaft $P^2$ and the arms P, moves the head M backward, retracting the rods N and N' until their ends lie within the front face of the gate and so as not to interfere with the raising of the said gate. In the second place the upward motion of the rod Q, acting on the lever U, moves the arms U' inward, and the said arms pressing against the annular lip $T^3$ on the rod $T^2$ press the said rod and the valve $T^5$ back to or in the rear of the position which they occupy in Fig. 2. The upward motion of the rod Q also brings the spring $q'$ into contact with the lever-arm $U^4$, raising it and the catch-lever $U^3$, connected with it, to a position, such as that shown in Fig. 2, where it will engage with the lip $T^3$. The further upward motion of the piston-rod I, acting on the pin H', raises the gate H, opening a free passage through the main tube A, whereupon the pressure of air behind the carrier will force it past the gate and into the portion of the main tube to the right of the gate, bringing it into contact with the finger W and moving said finger so as to make contact between it and the spring W'. This contact closes the circuit, which can be traced as follows, viz: from the finger W through the wire $X^{11}$ and the wire $X^6$ to the battery $Y^2$, thence through the branch $X^7$, through the electromagnet $J^4$, and the wire $X^{10}$ to the spring W'. The energizing of the magnet $J^4$ causes it to act upon the armature $J^2$, drawing the lever J down and bringing the valve $I^5$ to the position shown in Fig. 1, whereupon the compressed air beneath the piston $I^2$ will escape while motive fluid is supplied on top of said piston to force it and the gate H down.

Referring to Figs. 2 and 3, it will be observed that the catch-lever $S^2$ will, as the rod Q moves upward, be moved under its shoulder $Q^8$ by the action of the spring $S^4$, and upon the descending motion of the rod I the said catch-lever $S^2$ will hold the lever Q in its raised position, which, as already explained, involves the retraction of the head M and the rods N and N' until the gate has again closed the main tube, whereupon the further descent of the rod I, acting on the lever S', will retract the catch-lever $S^2$ and permit the rod Q to move down to the position shown in Fig. 3, the effect of which is to thrust the head M and the rods carried by it out to the position shown in Fig. 2.

The plate V' on the front of the carrier V is a selecting device, as explained in my former application, the size of the plate determining whether or not it will come in contact with the rod N' in any particular gate. If the plate is of such a size as not to make contact with this rod, the switch D remains in the position shown in Fig. 1 and the carrier passes along over it through the main tube A. If, on the other hand, the selecting-plate V' is of such size as to make contact with the rod N' as well as the rod N, this contact closes the circuit, which is to be traced as follows: from the rod N through the wire X to the battery Y, thence through the wire X' and its branch $X^2$ to the electromagnet $L^4$, thence through the wire $X^3$ to the rod N', and thence through the selecting-plate V' to the rod N. The energizing of the magnet $L^4$ attracts the armature $L^2$ and moves the lever L toward the right. Said lever in turn acting on the valve-rod $K^6$ moves the valve $K^5$ to the right, admitting compressed air to the left-hand side of the piston $K^2$ and permitting it to exhaust from the other side of the cylinder K³. The piston therefore moves to the right, and acting through its rod K' and link K acts upon the lever D² and raises the switch D to the position shown in dotted lines in Fig. 1, so that the carrier is switched into the branch line B. After passing the switch the carrier comes in contact with the finger W² and moves it so as to make contact with the spring W³, closing the circuit through line X, the battery Y, the line X', its branch leading to the magnet L³, and thence through the wire X⁴ to the spring W³, the energizing of the magnet L³, acting on the armature L² and lever L, moving the valve back to the position shown in Fig. 1 and causing a motion of the piston K², which returns the switch D to the position shown in full lines in Fig. 1.

My invention as above described is embodied in the mechanism which I consider best adapted for its successful application, but is obviously capable of embodiment in various modifications of apparatus. Except, therefore, where my claims are specifically limited to the detailed construction shown, I wish it to be understood that such limitations are not to be implied and that such claims are intended to cover not only the specific mechanism illustrated, but all modifications of such mechanism which are in substance equivalent thereto.

Having now described my invention, what I claim as new, and desire to secure by Letters Patent, is—

1. In a pneumatic transmission system, a main tube and a branch tube extending therefrom in combination with means for checking the motion of a carrier as it approaches the junction of the tubes, a switch at the junction of the tubes and means arranged to be engaged and actuated by the carrier after its motion is checked for automatically moving said switch.

2. In a pneumatic transmission system a main tube and a branch tube extending therefrom in combination with a gate arranged in advance of the junction of the tubes to close and open the main transmission-tube, an air by-pass conduit connecting with the main tube on each side of the gate the front connection being such as to leave a dead-air space in front of the gate and means for opening the gate having actuating devices situated in the dead-air space aforesaid and arranged to be set in operation by a carrier as it approaches said gate.

3. In a pneumatic transmission system, a main tube and a branch tube extending therefrom in combination with a gate arranged in advance of the junction of the tubes to close and open the main transmission-tube, an air by-pass conduit connecting with the main tube on each side of the gate, the front connection being such as to leave a dead-air space in front of the gate, means for opening the gate having actuating devices situated in the dead-air space aforesaid and arranged to be set in operation by a carrier as it approaches said gate, and means for closing the gate arranged to be set in operation by the carrier as it recedes from said gate.

4. In a pneumatic transmission system, a main tube and a branch tube extending therefrom in combination with a gate arranged in advance of the junction of the tubes to close and open the main transmission-tube, an air by-pass conduit connecting with the main tube in each side of the gate, the front connection being such as to leave a dead-air space in front of the gate, a switch at the junction of the tubes, means for actuating the gate having actuating devices situated in the dead-air space aforesaid and arranged to be set in motion by the carrier and means for actuating the switch arranged to be set in motion by a selecting device on the carrier.

5. In a pneumatic transmission system, a main tube and a branch tube extending therefrom in combination with a gate arranged in advance of the junction of the tubes to close and open the main transmission-tube, an air by-pass conduit connecting with the main tube on each side of the gate the front connection being such as to leave a dead-air space in front of the gate, a switch at the junction of the tubes, means for opening the gate having actuating devices situated in the dead-air space aforesaid and arranged to be set in motion by a selecting device on the carrier, and means for closing the gate and switch arranged to be set in operation by the carrier as it recedes from said gate and switch.

6. In a pneumatic transmission system, a main tube and a branch tube leading therefrom, a normally-closed gate situated in the main tube in advance of the junction, an air by-pass leading around the gate, a switch at the junction of the main and branch tubes, means for opening and closing the gate in the main tube, an electromagnet arranged to actuate said means to open the gate, a normally open circuit including said electromagnet, means for closing said circuit actuated by the approach of a carrier to the gate, means for operating the switch, an electromagnet arranged to actuate said means, a normally open circuit including said electromagnet and means for closing said circuit arranged to be operated by a selecting device on the carrier.

7. In a pneumatic transmission system, the combination with a tube of a sliding gate arranged to close the same, a passage, as T⁶, through said gate which when open permits the air to escape through it, a valve arranged to close said passage, means as spring Q⁵ tending to open said valve, a catch arranged to hold said valve closed and means actuated by an increase of pressure in front of the gate for releasing said catch.

8. In a pneumatic transmission system, the combination with a tube of a sliding gate arranged to close the same, a passage, as T⁶, through said gate which when open permits the air to escape through it, a valve arranged to close said passage, means as spring $Q^5$ tending to open said valve, a catch arranged to hold said valve closed, means actuated by an increase of pressure in front of the gate for releasing said catch, and means actuated by the movement of the gate in opening arranged to close the valve and reset its catch.

9. In a pneumatic transmission system, the combination with a tube of a sliding gate arranged to close the same, a passage, as $T^6$, through said gate which when open permits the air to escape through it, a valve arranged to close said passage, means as spring $Q^5$ tending to open said valve, a catch arranged to hold said valve closed, means actuated by an increase of pressure in front of the gate for releasing said catch, means for opening the gate and mechanism for setting said means in operation arranged to be actuated by a carrier and placed close to the front face of the gate.

10. In a pneumatic transmission system, the combination with a tube of a sliding gate arranged to close the same, a retractable head, as M, situated in the gate, rods as N N' supported on said head and arranged to project beyond the face of the gate when the head is in the forward position, said rods constituting part of the gate-actuating mechanism, means as rod I for actuating the gate, means for retracting the head M and a connection from said last-mentioned means to rod I whereby the motion of said rod first retracts the head and then raises the gate.

BIRNEY C. BATCHELLER.

Witnesses:
CHAS. F. MYERS,
D. STEWART.